(12) United States Patent
Knor et al.

(10) Patent No.: US 8,894,227 B2
(45) Date of Patent: Nov. 25, 2014

(54) METHOD AND APPARATUS FOR CORRECTING OPTICAL ABERRATIONS USING A DEFORMABLE MIRROR

(75) Inventors: Peter Knor, Athens, GA (US); David A. Agard, Burlingame, CA (US); Zvi Kam, Tel Aviv (IL); John W. Sedat, San Francisco, CA (US)

(73) Assignees: The Regents of the University of California, Oakland, CA (US); Yeda Research & Development Co. Ltd., Rehovot (IL)

(*) Notice: Subject to any disclaimer, the term of this patent is extended or adjusted under 35 U.S.C. 154(b) by 457 days.

(21) Appl. No.: 12/863,866

(22) PCT Filed: Jan. 30, 2009

(86) PCT No.: PCT/US2009/032592
§ 371 (c)(1),
(2), (4) Date: Feb. 23, 2011

(87) PCT Pub. No.: WO2009/097503
PCT Pub. Date: Aug. 6, 2009

(65) Prior Publication Data
US 2011/0134552 A1   Jun. 9, 2011

Related U.S. Application Data

(60) Provisional application No. 61/024,726, filed on Jan. 30, 2008.

(51) Int. Cl.
*G02B 5/08* (2006.01)
*G02B 7/182* (2006.01)
*G02B 27/00* (2006.01)
*G02B 26/08* (2006.01)

(52) U.S. Cl.
CPC ........ *G02B 27/0068* (2013.01); *G02B 26/0825* (2013.01)
USPC ............................ 359/847; 359/871; 359/872

(58) Field of Classification Search
USPC ........................................................ 359/847
See application file for complete search history.

(56) References Cited

U.S. PATENT DOCUMENTS 3,972,600 A * 8/1976 Cobarg .................... 359/840
5,986,795 A * 11/1999 Chapman et al. ......... 359/224.1
(Continued)

FOREIGN PATENT DOCUMENTS

| JP | 9 293915 | 11/1997 |
| JP | 2006 012286 | 1/2006 |

OTHER PUBLICATIONS

International Preliminary Report on Patentability dated Aug. 12, 2010 in PCT/US2009/032592.

(Continued)

*Primary Examiner* — Jade R Chwasz
(74) *Attorney, Agent, or Firm* — Stroock & Stroock & Lavan LLP

(57) ABSTRACT

A method and apparatus for correcting optical aberrations in an optical device using a deformable mirror. An actuator is provided which applies a deforming force to the deformable mirror. By selecting particular thickness profiles of the deformable mirror and force configurations of the actuator, the optical device can be configured to correct for different optical aberrations. The actuator may be configured to apply the deforming force peripherally, centrally, non-centrally or homogenously across the surface of the deformable mirror. The deformable mirror may be a flat disk mirror, a convex mirror, or a concave mirror, and may include a membrane having a variable flexibility. The optical device may be a wide-field microscope, an optical read/write device, laser tweezers, or any other optical device in which correction of optical aberrations is desirable.

31 Claims, 16 Drawing Sheets

(56) References Cited

U.S. PATENT DOCUMENTS

| | | | |
|---|---|---|---|
| 6,108,121 A * | 8/2000 | Mansell et al. | 359/291 |
| 6,843,572 B2 * | 1/2005 | Shiraishi | 359/846 |
| 7,229,178 B1 * | 6/2007 | Headley et al. | 359/847 |
| 2003/0214734 A1 | 11/2003 | Nishioka et al. | |
| 2004/0223212 A1 * | 11/2004 | Sakuma | 359/355 |
| 2004/0233553 A1 | 11/2004 | Shibata et al. | |
| 2006/0103956 A1 * | 5/2006 | Griffith et al. | 359/845 |
| 2007/0165312 A1 | 7/2007 | Aoki et al. | |
| 2007/0258158 A1 | 11/2007 | Aoki et al. | |
| 2007/0268592 A1 * | 11/2007 | Kam et al. | 359/637 |

OTHER PUBLICATIONS

Extended European Search Report dated Oct. 17, 2011 issued in EP09705470.4.

\* cited by examiner

Oil-immersion objective, NA=1.4 Imaging inside aquaous buffer

Air objective, NA=0.95 Imaging inside plastic

METHOD AND APPARATUS FOR CORRECTING OPTICAL ABERRATIONS USING A DEFORMABLE MIRROR

CROSS REFERENCE TO RELATED APPLICATIONS

The present application claims the benefit of U.S. Provisional Patent Application Ser. No. 61/024,726, filed Jan. 30, 2008, the contents of which are hereby incorporated by reference in their entirety.

FIELD OF THE INVENTION

The invention relates generally to a method and apparatus for correcting optical aberrations. More specifically, the invention relates to a method and apparatus for correcting optical aberrations using a deformable mirror.

BACKGROUND OF THE INVENTION

Many applications employing optical devices are limited by optical aberrations that result from the configuration of the optical device. The term "optical aberrations" includes deviations from the correct function of the optical device that result from disruptions and distortions of optical paths associated with the device. A source of optical aberrations that is particularly limiting in the use of optical devices is the object of the optical device. The object, or sample, refers to the element that the optical device is designed to perform a particular function on. Object-induced, or sample-induced, aberrations result from the refractive properties of the object or the optical path between the object and the optical device, and may include spherical aberrations that are symmetrical around the optical axis, as well as other types of aberrations.

Aberrations can be characterized by the shift in optical path experienced by a ray of light as it travels from a point source (i.e., a point at a given depth within a sample) through the sample. For many common configurations (i.e., for a system with a set sample refractive index and a set atmospheric or objective immersion refractive index separated by an interface plane perpendicular to the optical axis) the shift in optical path is only dependent upon the depth of the point source within the sample and the angle at which the ray of light travels through the sample relative to the optical axis.

The pupil plane in an optical device is the plane where the position of each ray depends solely on the angle of emergence from the sample alone. For any given optical device, it is possible to determine where at the pupil plane a ray with a particular angle of emergence will be positioned. Accordingly, at this plane, it is possible to identify the angle of emergence from the sample for each ray based upon the position of the ray at the pupil plane. Since in common configurations the shift in optical path depends on depth and angle alone, for each depth it is possible to correct the spherical aberrations at the pupil plane by introducing an optical element that can correct each ray of light according to its optical path shift.

Spherical aberrations are particularly problematic when analyzing moderately thick objects because they are depth dependent. A detailed discussion of optical aberrations, and a method and system for correcting optical aberrations, including spherical aberrations, is provided in U.S. patent application Ser. No. 11/419,070, which is incorporated herein by reference. The '070 application describes a method and system for correcting optical aberrations in applications such as wide-field microscopy, optical tweezers and optical media read/write devices. The '070 application teaches the use of adaptive optical elements of several types, such as a liquid lens (adjusted by pressure), a deformable membrane mirror (adjusted by piezoelectric or magnetic pistons), micro electro-mechanical (MEMS) mirrors, or various liquid crystal phase and amplitude modulators (with optical properties that are controlled pixel-by-pixel electrically via the patterned surfaces holding the liquid between them). Additionally, the '070 application provides that a mirror, such as a deformable mirror, may be used as an adaptive optical element for correcting optical aberrations.

Existing deformable mirror elements that use a force at the center of the rear surface of a mirror create a parabolic shape deformation on the mirror's surface. See, e.g., U.S. Pat. No. 7,229,178, which is incorporated herein by reference. Such mirrors can be made as small as required. The resulting wavefront after reflection in such mirrors can change the focus of the impinging wave, however, they introduce an additional large component of spherical aberrations. Other types of mirrors are deformed by introducing forces applied by multiple actuators at multiple locations on the mirror (typically on a rectangular or hexagonal array of points). These mirrors have more degrees of freedom for creating arbitrary functions of distortions for shaping a wavefront reflected from their surface. However, they are problematic in that they must be sufficiently large in order to provide space for the actuators, and they are associated with high-order aberrations introduced by the array of pistons. This problem is shared by both segmented mirrors (where each mirror segment is associated with one piston for displacement and maybe additional pistons for tilt) and "shape mirrors" (where multiple pistons push on a deformable membrane mirror). Both types of mirrors create deviations from the ideally required shape at the spatial frequency of the piston array; this is called piston "print through" or "waffle." Another kind of adaptive optical element based on liquid crystals has small size and high spatial resolution.

However, a problem shared by most available adaptive elements is their limited range of creating phase shifts (e.g., a few wavelengths for typical devices). The maximum phase shift introduced by an adaptive optical element is called "throw". Typical adaptive devices with throws of the order of two wavelengths can correct small aberrations, but have limited capability to change the focus of optical systems. They cannot correct aberrations in moderately thick objects, and cannot change focus in a useful scale. Other types of electric and magnetic actuators that can introduce more "throw" are large and transduce a very limited amount of force. These actuators are used with soft deformable membrane mirrors and have large "print-through" effects. The large size of the mirrors necessitates long optical distances that require large and bulky optical systems.

SUMMARY OF THE INVENTION

The present invention provides a method and apparatus that uses an improved deformable mirror in optical systems to change the focus and corrects optical aberrations, such as spherical aberrations, when analyzing objects, particularly moderately thick objects, without the disadvantages associated with existing approaches. Unlike existing optical systems with larger deformable mirrors, the present invention provides a method and apparatus that simply and precisely deforms a deformable mirror to a shape that provides a variable focal plane at varying depths within an object and corrects optical aberrations. In order to simply and precisely achieve the necessary shape function in the deformable mirror, the deformable mirror may have a variable thickness that provides the necessary deflective characteristics to create surface displacement functions for correcting optical aberrations and changing focus within an object, including moderately thick objects. Further, a simple and precise actuation system may be employed that deforms the variable thickness deformable mirror. The present invention may be implemented in many fields, including wide-field microscopy, optical tweezers and in optical media recording and reading devices. Moreover, the present invention may be incorporated into and implemented with the method and system taught by the '070 application.

According to an embodiment of the present invention, an apparatus for correcting optical aberrations in an optical device includes a deformable mirror having a variable thickness and an actuator configured to deform the deformable mirror. The deformable mirror may be anchored at its periphery and the actuator may be configured to apply a force to a central portion of the deformable mirror. The deformable mirror may be thinner at its periphery than at its center. The deformable mirror may also be thicker at its periphery than at its center. The deformable mirror may include a reflective surface that is configured to be shaped into a plane, a concave or a convex shape at equilibrium (without forces applied to it), leaving the thickness function free to be determined by the needed deformation from the equilibrium shape which is created by a single force actuator, e.g., pressing or pulling at a generally central portion of the deformable mirror. The actuator may be connected to a small pin emerging from the back of the mirror to closely approximate a point force. The pin may be located in a center or off-center position on the back of the mirror. Alternatively, the actuator may transduce the piston forces via a pressurized liquid that applies the forces homogeneously and uniformly to the deformable mirror such that the mirror deformation is a concave or a convex shape when higher or lower pressure is applied. Alternatively, a force may be applied circumferentially. The deformable mirror may be either a flat disk mirror with varying thickness or a stretched membrane mirror with variable elasticity, the flat disk or the stretched membrane mirror configured to produce the desired displacement function across its surfaces when forces or pressure act upon it.

According to another embodiment of the present invention, an apparatus for correcting optical aberrations in an optical device includes a deformable mirror having a variable thickness and an actuator configured to deform the deformable mirror where the actuator is configured to apply a compressive force along a circumferential portion of the deformable mirror where the deformable mirror is formed into a convex or concave shape under compression. The deformable mirror may be thinner at its periphery than at its center. The deformable mirror may also be thicker at its periphery than at its center. The apparatus may include a circumferential element positioned around a periphery of the deformable mirror. The actuator may actuate the circumferential element such that the circumferential element compresses the deformable mirror radially all around it. The actuator may be a single force actuator, such as a piezoelectrical device. The circumferential element may be a collet chuck, or a contracting ring. The deformable mirror may be a flat disk mirror made of metal, glass or plastics with variable thickness designed to deform upon introduction of the peripheral force according to a given displacement function. An advantage of this embodiment is that actuators that produce small displacements with large forces are placed to transform the mirror with much larger displacements. For example, if a piezoelectric piston introduces a 10 micrometer displacement at its tip, the circumferential device can translate it into a 30-fold displacement (about 0.3 min) at the mirror center.

According to another embodiment of the present invention, a method for correcting optical aberrations in an optical device includes the steps of: positioning an adaptive optical system in or close to a pupil plane, the adaptive optical system including at least one adaptive optical element, the adaptive optical element including a deformable mirror having a variable thickness and an actuator configured to deform the deformable mirror; configuring the adaptive optical element to correct optical aberrations at a first depth of focus within a sample; and reconfiguring the adaptive optical element to change focus and correct for optical aberrations at a second depth within the sample, the second depth being different from the first depth. The adaptive element may also include additional features of the apparatus for correcting optical aberrations discussed herein. If the optical device is a wide-field microscope, the method may also include the step of successively acquiring a plurality of images at different depths of focus within the sample over a predetermined period of time. If the optical device is a microscope, aberration-free three-dimensional images may be acquired. If the optical device is a three-dimensional recordable medium, data may be written or read from multiple layers.

BRIEF DESCRIPTION OF THE DRAWINGS

Further details and aspects of example embodiments of the present invention are described in more detail with reference to the Figures, in which.

DETAILED DESCRIPTION OF THE EMBODIMENTS

Figure 1:
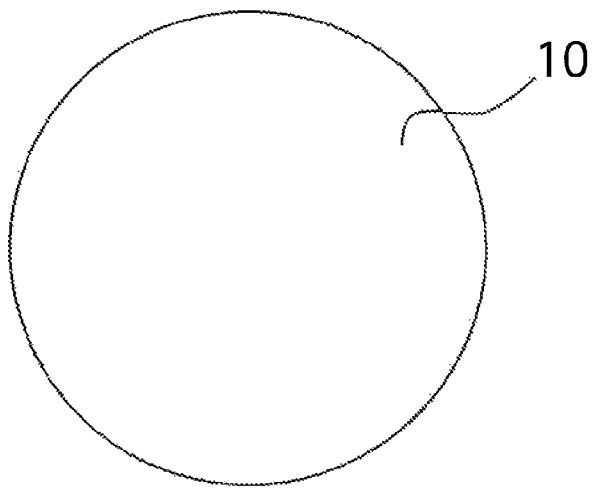
FIG. 1 is a top view of a deformable mirror having a variable thickness according to a first embodiment of the present invention.
Figure 2A:
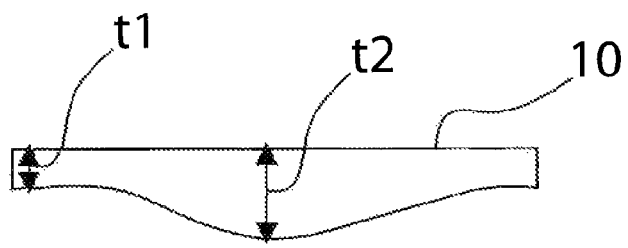
FIG. 2A is a side view of a deformable mirror with a flat reflecting surface, wherein the center thickness is greater than the peripheral thickness.
Figure 2B:
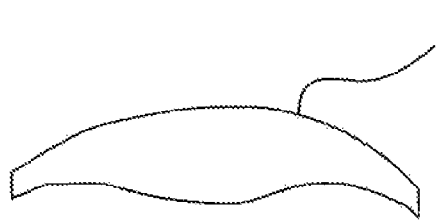
FIG. 2B is a side view of a deformable mirror with a convex reflecting surface, wherein the center thickness is greater than the peripheral thickness.
Figure 2C:
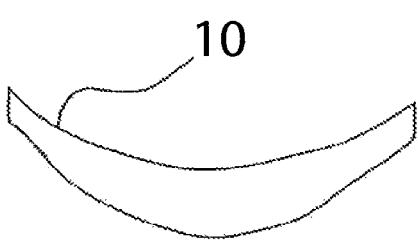
FIG. 2C is a side view of a deformable mirror with a concave reflecting surface, wherein the center thickness is greater than the peripheral thickness.
Figure 2D:
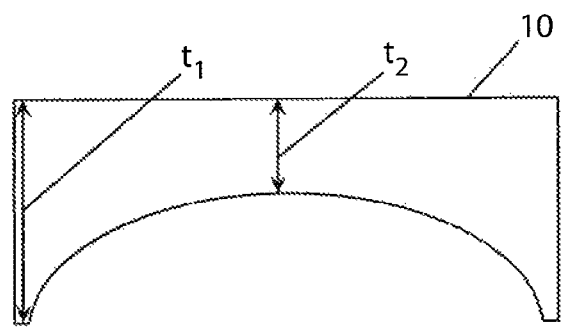
FIG. 2D is a side view of a deformable mirror with a flat reflecting surface, wherein the center thickness is less than the peripheral thickness.
Figure 2E:
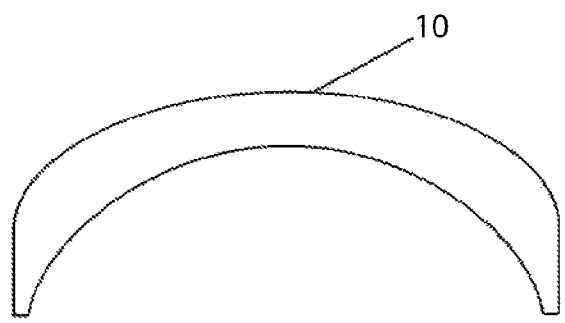
FIG. 2E is a side view of a deformable mirror with a convex reflecting surface, wherein the center thickness is less than the peripheral thickness.
Figure 2F:
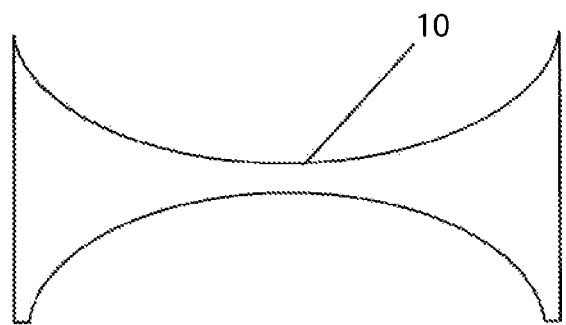
FIG. 2F is a side view of a deformable mirror with a concave reflecting surface, wherein the center thickness is less than the peripheral thickness.

FIGS. 1 and 2A-2F illustrate a deformable mirror 10 having a variable thickness. In some embodiments, as depicted in FIGS. 2A-2C, deformable mirror 10 is thinner at its periphery than at its center, i.e., peripheral thickness t1 is smaller than central thickness t2. In other embodiments, as depicted in FIGS. 2D-2F, deformable mirror 10 is thicker at its periphery than at its center, i.e., peripheral thickness t1 is greater than central thickness t2. The relative thickness of the periphery and center of the deformable mirror 10 affects the shape of the deformation that will result when a deforming force is applied to the deformable mirror 10. By modifying the relative thickness of its periphery and center, the deformable mirror 10 can be configured to correct for various effects including, but not limited to, high numerical aperture focus, depth aberrations, thermal lensing, and off-axis aberrations.

The relative thickness of the periphery and center of the deformable mirror 10 can be chosen based on the angular dependence function of the aberrations to be corrected. In the embodiments in which the deformable mirror 10 is thinner at its periphery than at its center, the application of a deforming force causes the deformable mirror 10 to deform by a relatively large amount along its periphery. This results in a relatively large change in the phase of the reflected wavefront at large angles. By contrast, in the embodiments in which the deformable mirror 10 is thicker at its periphery than at its center, the application of a deforming force causes the deformable mirror 10 to deform by a relatively large amount away from its periphery. This results in a relatively large change in the phase of the reflected wavefront at small angles. Therefore, a deformable mirror 10 that is thinner at its periphery than at its center can be used when relatively large phase changes are desired at large angles, while a deformable mirror 10 that is thicker at its periphery than at its center can be used when relatively large phase changes are desired at small angles.

Deformable mirror 10 is not limited to the specific profiles illustrated. It may have alternate profiles of varying thicknesses that provide desired surface displacements from equilibrium when forces act to distort the mirror and therefore, shift the phase of a reflected wavefront as a function of position on the mirror (e.g., as a function of radius for spherical aberration corrections). Deformable mirror 10 may be a flat disk mirror with variable thickness, e.g., as shown in FIG. 2A and 2D, a convex mirror with variable thickness, e.g., as shown in FIG. 2B and 2E, or a concave mirror with variable thickness, e.g., as shown in FIG. 2C and 2F, a stretched membrane mirror with variable rigidity or another optical element suitable for changing focus and correcting optical aberrations. Although deformable mirror 10 is shown having a circular shape it may have other noncircular shapes. The forces applied to the mirror to displace its surface may act at the center portion, through the perimeter, or homogeneously via liquid pressure, e.g., see FIG. 6. The forces applied to the mirror may also act away from the center of the mirror, thus allowing compensation for non-spherical aberrations. Mechanical displacements in the elastic range of deformation are proportional to the force applied. A single actuator mirror with any desired thickness function may be configured to generate a wavefront phase-shift function across its aperture which is proportional in amplitude to the applied force. For example, in the focusing and correction of depth aberrations the force may be proportional to the defocus from a depth at which the optics were aberration free.

Figure 3:
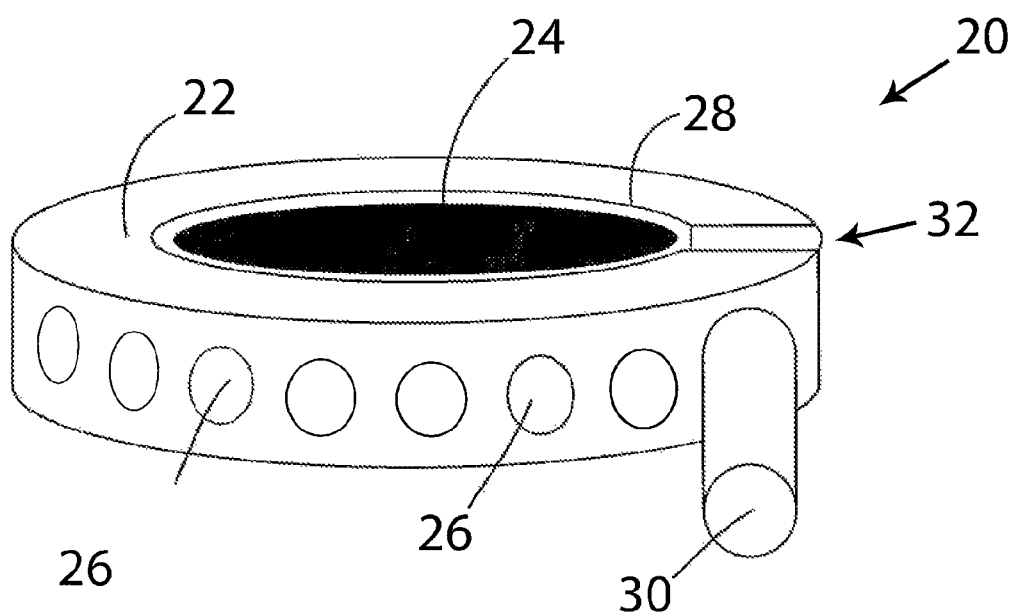
FIG. 3 is a perspective view of an apparatus having a contracting ring according to an alternative embodiment of the present invention.
Figure 4:
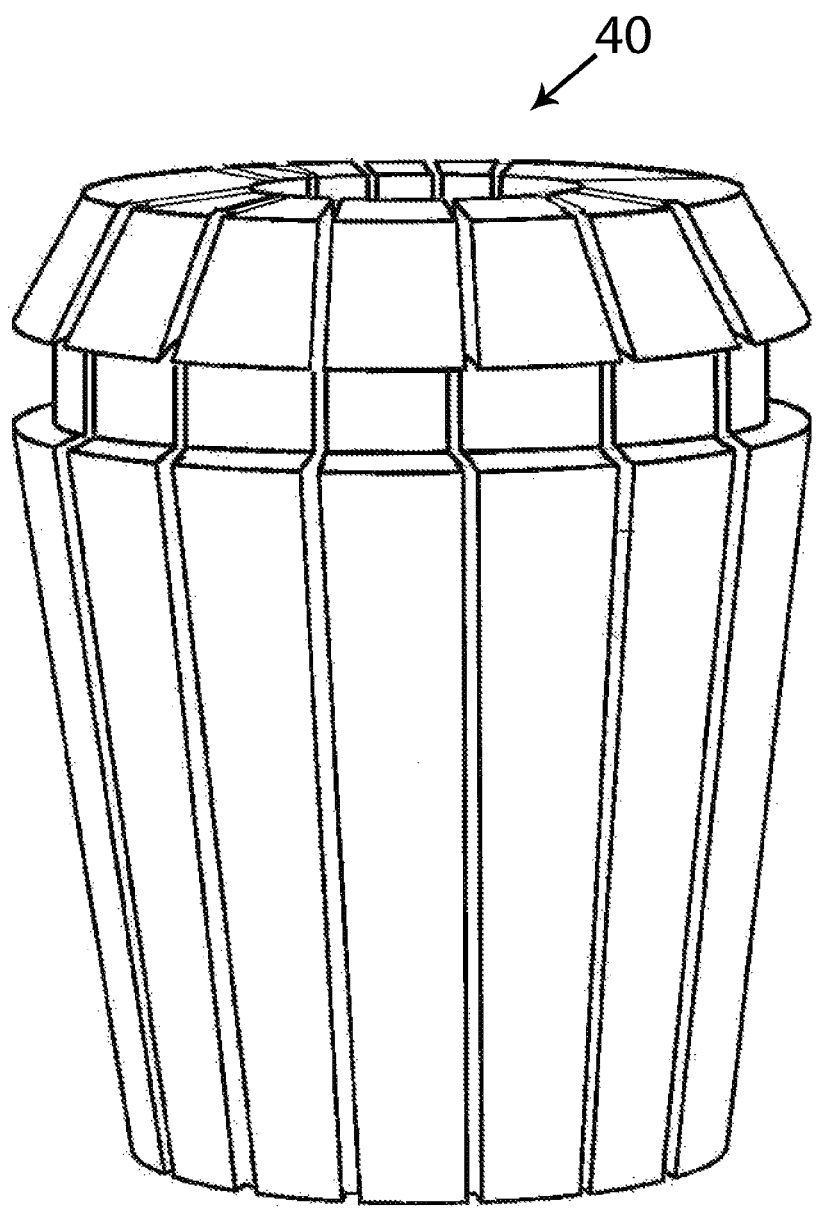
FIG. 4 is a perspective view of an apparatus having a collet chuck according to an alternative embodiment of the present invention.

FIGS. 3 and 4 illustrate different apparatus for applying peripheral compression to a deformable mirror. In FIGS. 3 and 4 an actuator is configured to transmit a compressive force along a circumferential portion of a deformable mirror such that the mirror deformation forms a convex or concave curvature.

FIG. 3 illustrates an apparatus 20 for correcting optical aberrations that includes a circumferential element in the form of a contracting ring 22. Multiple set screws 26 secure contracting ring 22 to an outer surface 28 of deformable mirror 24. Deformable mirror 24 may be in the form of deformable mirror 10. Set screws 26 are located around the circumference of contracting ring 22 such that uniform force is applied around the circumference of deformable mirror 24 when contracting ring 22 is contracted. Although set screws 26 are shown, other securement mechanisms, such as pins, snaps, adhesives, etc. may be used to secure or anchor contracting ring 22 to deformable mirror 24. An actuator applies a force to receiving member 30 of contracting ring 22 thereby causing gap 32 to close and contracting ring 22 to contract. The actuator may be a piezoelectric actuator and may apply a single force to force receiving member 30 of contracting ring 22. Other types of actuators and force elements may be used to apply a force or forces to contracting ring 22. The contraction of contracting ring 22 around a periphery of deformable mirror 24 causes deformable mirror 24 to bulge. Deformable mirror 24 may be configured, and a force may be transmitted, such that deformable mirror 24 deforms with a substantially concave or convex curvature, the exact deformation function of the mirror surface may be determined by the forces and the mirror thickness function.

FIG. 4 illustrates a collet chuck 40 that may be used to apply peripheral compression to a deformable mirror. A deformable mirror, such as deformable mirror 10, is positioned such that when collet chuck 40 is actuated it applies a force around the circumference of the deformable mirror causing the deformable mirror to form a desired shape. Collet chuck 40 is shown as a multiwrench collet chuck but may be in the form of other types of collet-like chucks. Peripheral compression of the deformable mirror may be achieved by an actuated force-element acting on collet chuck 40. The force element may be a single force element.

As discussed above, deformable mirror 10 need not have a circular shape. It may, for example, have an elliptical shape. Further, the retaining ring or collet around the edge of the mirror may be elliptical in shape. Still further, the mirror may have an elliptical profile. It is possible to provide an elliptical correction function to account for off-axis corrections.

Figure 5:
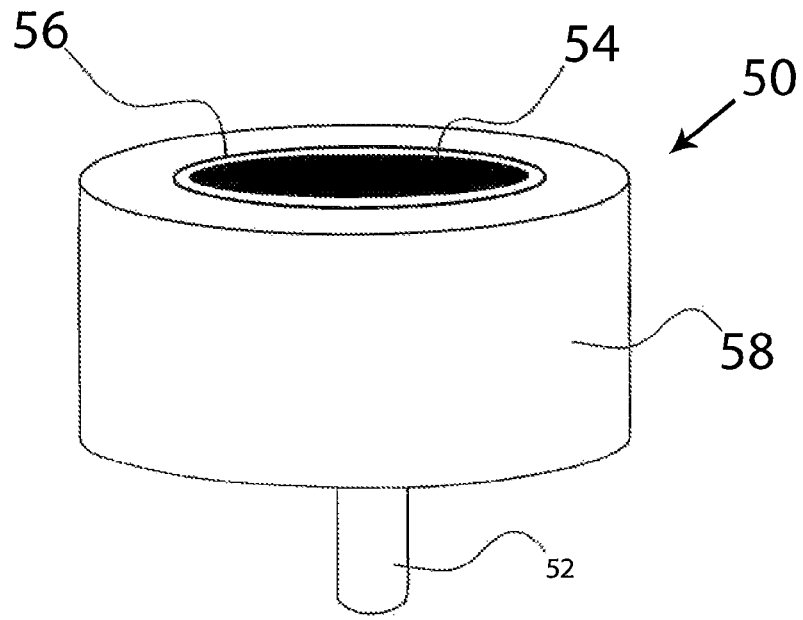
FIG. 5 is a perspective view of an apparatus having a piston according to an alternative embodiment of the present invention.
Figure 5A:
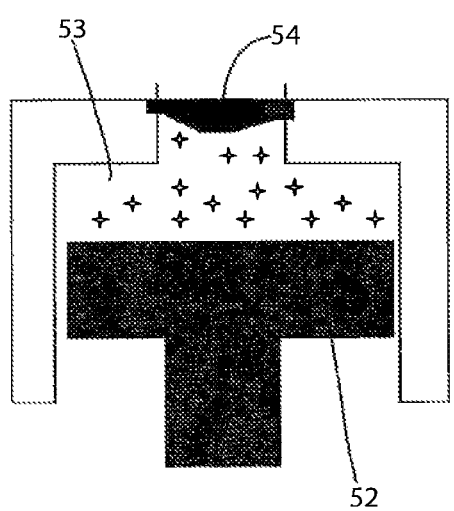
FIG. 5A is a cross-section view of a piston providing force transduction via pressurized liquid.
Figure 5B:
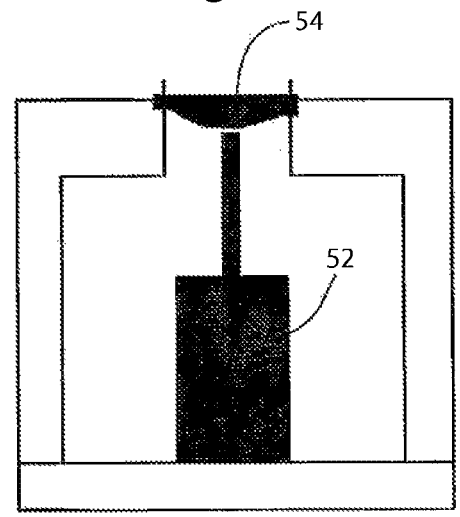
FIG. 5B is a cross-section view of a piston that transduces force to a generally central portion of the mirror.

FIGS. 5, 5A and 5B illustrate an apparatus for deflecting a deformable mirror 54. In FIG. 5, deformable mirror 54 is anchored at its periphery 56 to member 58. An actuator, e.g., a piezoelectric actuator, may apply a force to a piston 52 which pushes a liquid 53 against deformable mirror 54, see, e.g., FIG. 5A. The liquid homogeneously applies a force against deformable mirror 54. The liquid may also be configured such that it applies forces to specific areas of deformable mirror 54. Deformable mirror 54 may be in the form of deformable mirror 10.

Alternatively, in FIG. 5B, a piston 52 is configured to directly apply a force to deformable mirror 54. Piston 52 may push or pull deformable mirror 54 such that it forms a desired shape. Piston 52 may be configured to act directly on a central portion of deformable mirror 54. Again, deformable mirror 54 may be in the form of deformable mirror 10. Piston 52 may be rigidly connected to the back of the mirror to allow pushing and pulling forces, or touching the back of the mirror to allow only pushing forces.

FIGS. 6 through 10 are referenced in calculation sections I, II and III below.

A system for correcting optical aberrations in an optical device may include an adaptive optical system. The adaptive optical system includes at least one adaptive optical element positioned for example in a pupil plane and is capable of correcting optical aberrations at a first depth of focus within a sample. The adaptive optical element is capable of being reconfigured to correct for optical aberrations at a second depth within the sample, the second depth being different from the first depth. The adaptive element includes a deformable mirror having a variable thickness and an actuator configured to deform the deformable mirror. The adaptive element may also include the features of the apparatus for correcting optical aberrations discussed herein. The optical device may include a wide-field microscope, optical tweezers or an optical read/write media drive.

Figure 11A:
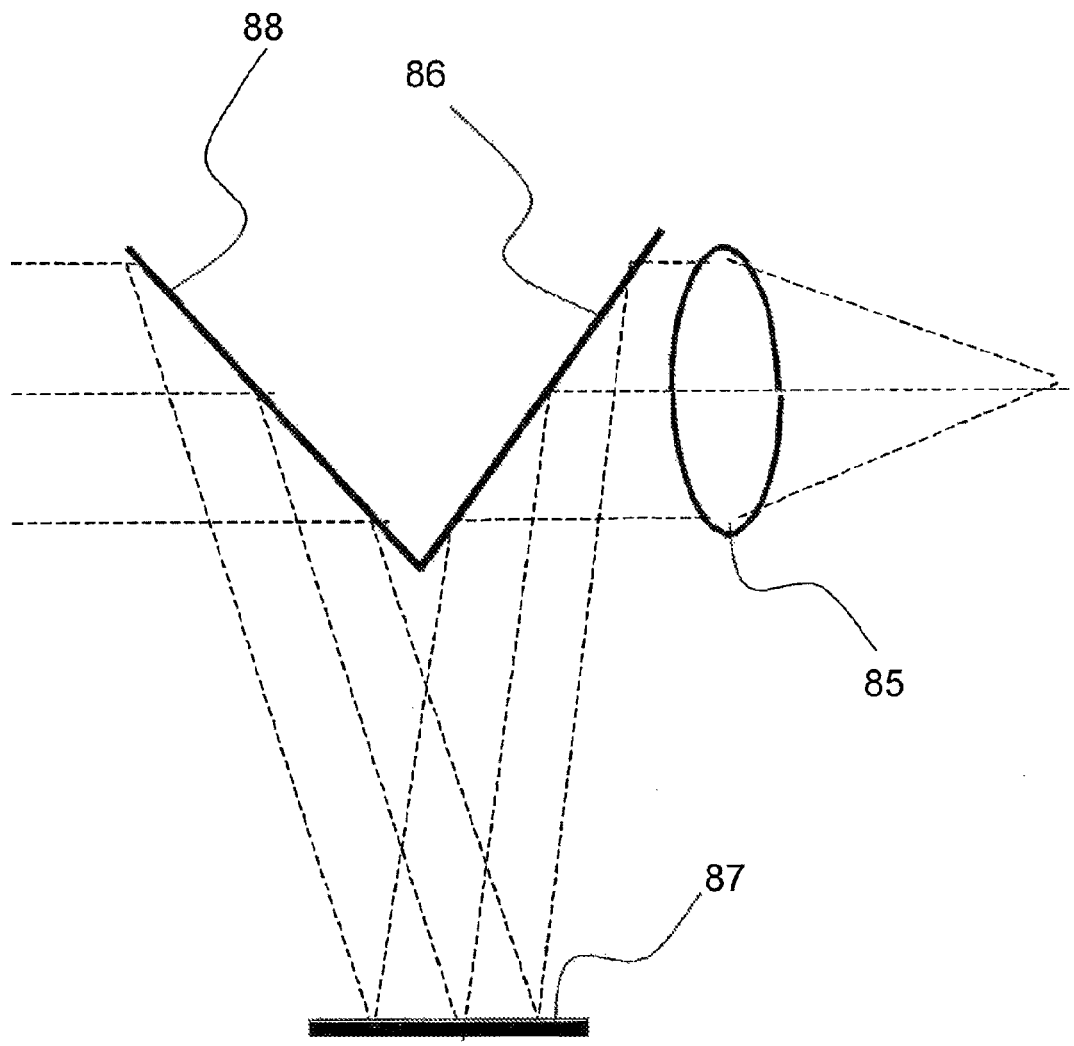
FIGS. 11A and 11B are schematic illustrations of optical setups incorporating adaptive mirrors.
Figure 11B:
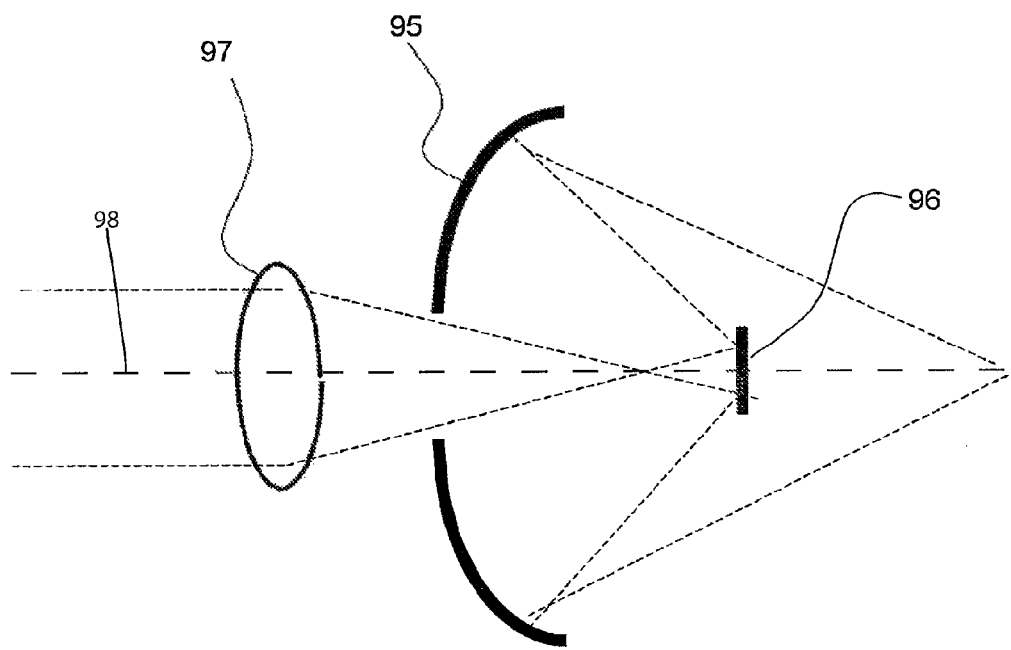

FIGS. 11A and 11B show schematic configurations for incorporating deformable mirrors in optical systems for creating aberration-free images at different focal planes. FIG. 11A, light (shown as dashed lines) from an image is collected via lens (or objective) 85, and is reflected by a mirror or prism 86 roughly perpendicular to the optical axis onto an adaptive or deformable mirror 87. The latter reflects the light back, and another reflection by a mirror or prism 88 returns the light to the optical axis with an aberration corrected wavefront for a desired focal plane set by the adaptive mirror 87. In FIG. 11B, a catadioptric arrangement is shown (e.g., "Cassegrain" optics) that collects the light (shown as dashed lines) to a convex deformable mirror 95. The light is reflected towards a small mirror 96 on the optical axis 98. The small mirror 96 reflects the light through an opening at the center of the deformable mirror towards optical setup 97. In both configurations described above, deformation of the mirror can be designed to change the focus plane and correct aberrations for the optical systems. Further, in configurations described above, the deformable mirrors may be located on axis or off axis in the optical systems.

Figure 12A:
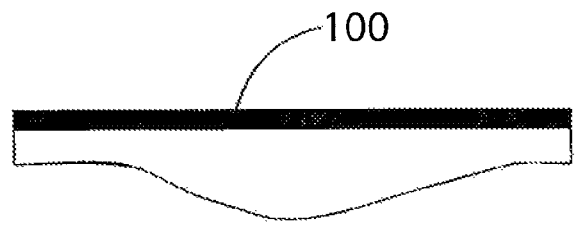
FIGS. 12A, 12B and 12C are side views of deformable mirrors with additional adaptive layers.
Figure 12B:
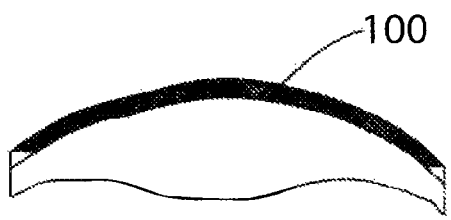
Figure 12C:
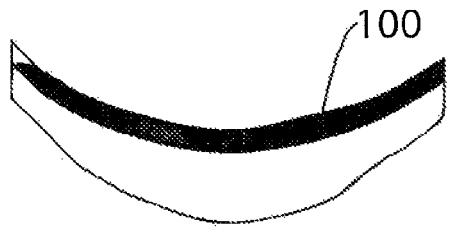

FIGS. 12A, 12B and 12C show that in addition to deforming a deformable mirror, as discussed above, a deformable mirror may be coated with a thin (active) element 100 (MEMS, liquid crystal, etc.) to locally correct small surface distortions and/or other aberrations. Also, a shaped (concave or convex) electroactive (or electrostrictive) polymer may be used to generate a desired wavefront in response to a variable voltage applied across it. Since the polymer compresses or expands in response to a voltage across its thickness, a dense array of transparent electrodes, (such as used in liquid crystal displays, LCDs) can be layered over the polymer to control, pixel-by-pixel the shift in the wavefront reflected from the mirror. This allows the fine-tuning of small corrections that can be added to the wavefront shifts created by the mirror itself. If the electroactive polymer is transparent it may be used as a transmission wavefront-engineering device, otherwise the upper surface may be coated with a reflective electrode and used as a deformable mirror displaced by the contraction or expansion of the polymer below it, in addition to the deformation of the substrate deformable mirror.

A method for correcting optical aberrations in an optical device includes the following steps: positioning an adaptive optical system for example in a pupil plane, where the adaptive optical system includes at least one adaptive optical element, the adaptive optical element includes a deformable mirror having a variable thickness and an actuator configured to deform the deformable mirror; configuring the adaptive optical element to correct optical aberrations at a first depth of focus within a sample; and reconfiguring the adaptive optical element to correct for optical aberrations at a second depth within the sample, the second depth being different from the first depth. If the optical device is a wide-field microscope, the method may also include the step of acquiring a plurality of images at different depths of focus within the sample successively over a predetermined period of time.

The aforementioned methods and apparatuses are advantageous in that they can generate larger vertical surface displacements of a deformable mirror by small displacements of an actuator, such as a piezoelectric actuator and can be made with a small optical diameter allowing their incorporation into compact optical systems, see, e.g., FIGS. 11A and 11B, and can be made to correct any desired shape with one or a small number of actuators. The compression may be accomplished by a piezoelectric device, resulting in speed and precision. Standard piezoelectric devices, which typically have a displacement range of approximately 10 micrometers, may be used to generate circumferential forces as described in order to produce about thirty times the displacement of the plate/deformable mirror surface (see, e.g., calculation section I below), yielding the needed range of depth aberration corrections for thick biological specimens, or for multilayer optical read/write devices. In addition, a piezoelectric device, or other device, may be used to pull or push on the center portion of a deformable mirror to further shape the surface as a function of depth. Alternatively, as discussed above, the piezoelectric device can actuate a piston to transduce homogeneous pressure to the back of a deformable mirror.

Figure 9A:
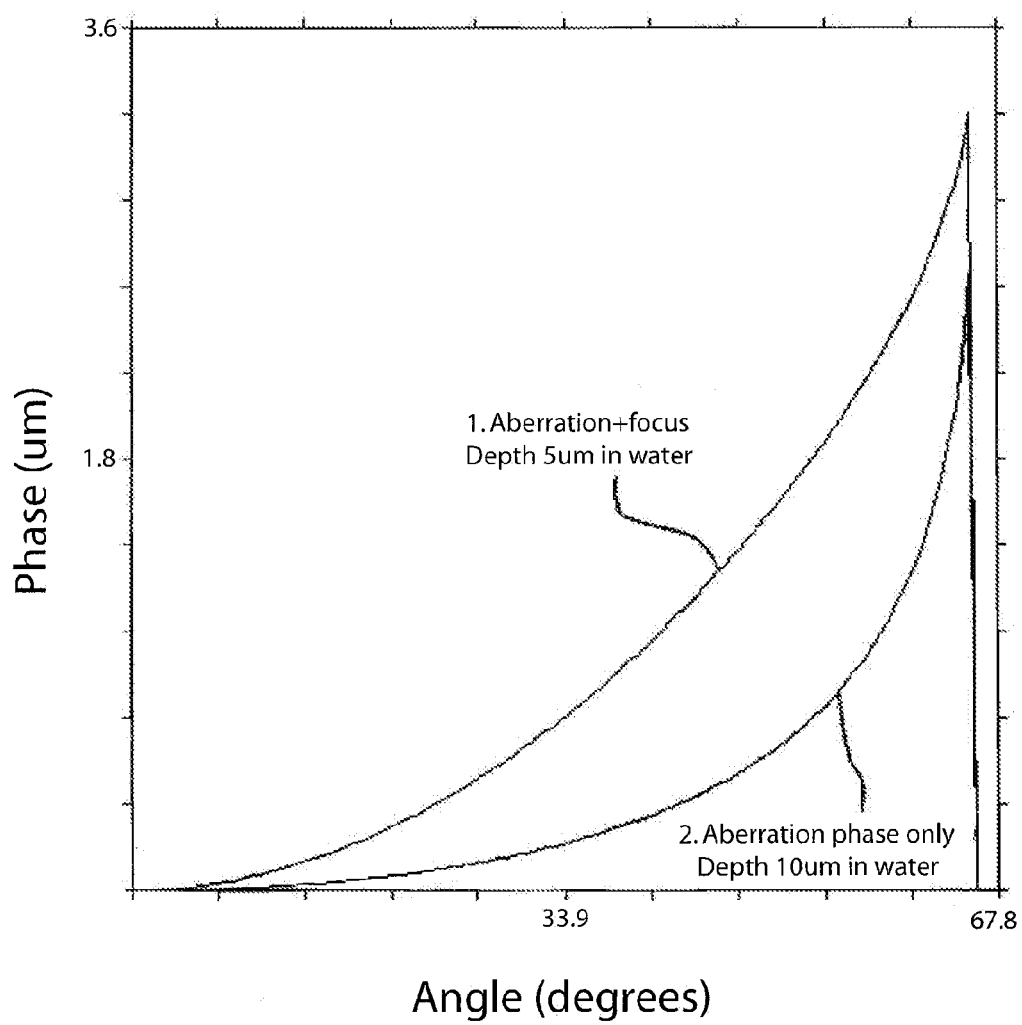
FIGS. 9A and 9B are graphs depicting radial dependence of mirror displacement functions needed to correct for focus and phase aberration resulting from refractive index mismatch between the immersion medium (or air) and a sample medium at a depth below a cover slide.
Figure 9B:
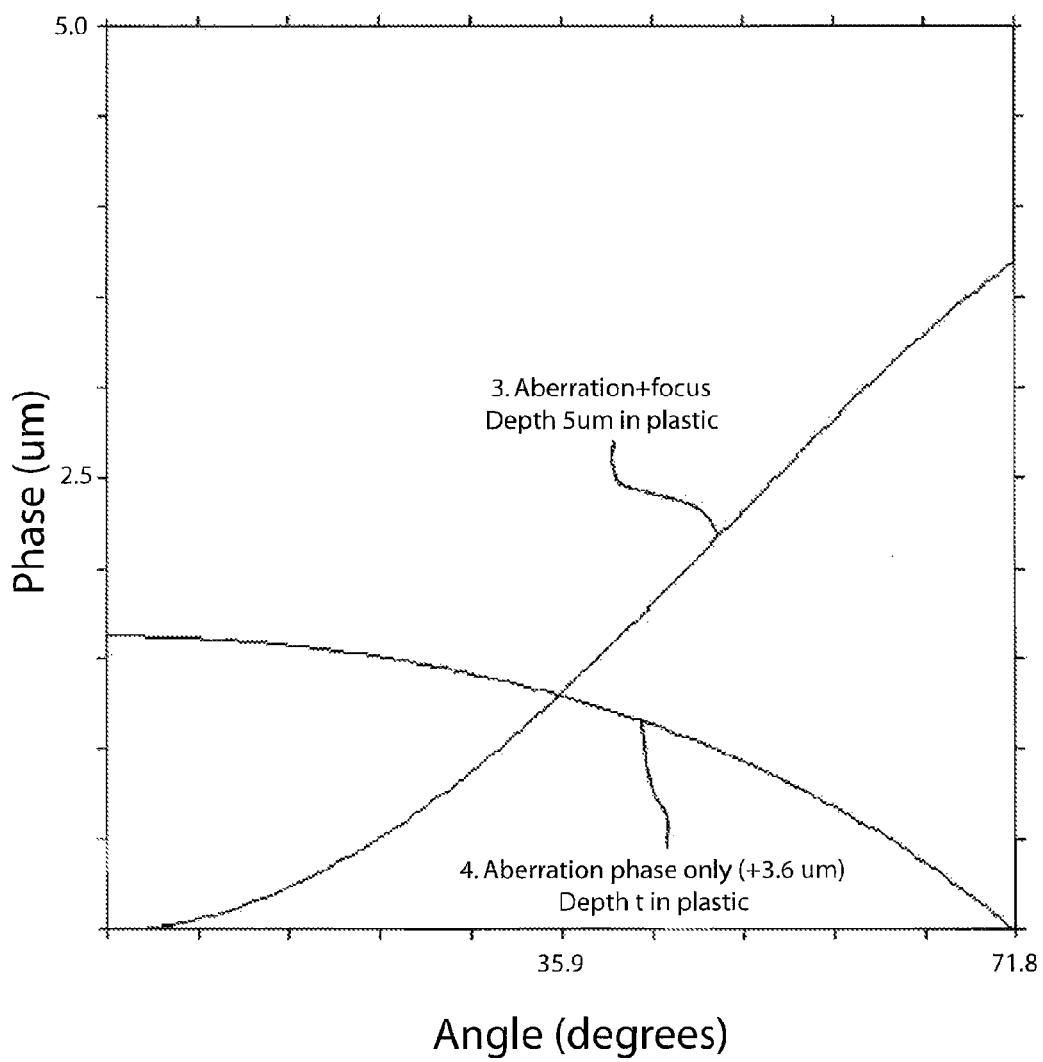

The aforementioned methods and apparatuses are also advantageous in that the profile or thickness of deformable mirrors/membranes may be provided such that a desired deflection takes place in the deformable mirrors/membranes. For example, an optical system configured to image different focal planes (or sample depths) may image different focal planes by moving the optics (and camera) with respect to a sample, by adjusting one or several optical elements within the optical system without changing the distance between a front element and the sample or the back element and the camera, or by adding a spherical phase-shift to the wavefront, e.g., using a mirror with variable curvature determined by the focal plane shift. However, high-magnification optical systems, such as microscopes and optical recorders, are typically designed with rays that traverse optics far away from the optical axis at large angles, and are optimized for minimal aberrations in a very stringent configuration. The optimal focal plane for an optical system is designed by minimizing the aberrations. Focusing to other planes can be achieved by adding a phase-shift to the wavefront. The added phase function that defocuses and corrects aberrations is concave with steep sides (steeper than spherical) for negative refractive index mismatch (e.g., live specimens microscopy using an oil-immersion objective into a water-embedded sample), and convex for optical recording devices, (focusing with an air lens into plastics). As shown in FIGS. 9A and 9B, approximately 50% of the phase modulation is required to correct for depth phase aberration, with the other 50% of the phase modulation needed by the spherical term of the focus function. Both phase-shift functions are concave, for focusing into smaller refractive index medium and derived using Equations 1 to 3 in the '070 application. As depth and focus increase, the more concave and steeper the sides of the mirror become. However, the phase function is linearly proportional to the depth at which the wave-front correction is applied, and therefore can be generated by proportionally increasing the forces on the deformable mirror/plate that is designed with a specific thickness variation to create this function.

As set forth below in calculation section I, with reference to FIG. 6, an estimate of the deflection of a deformable mirror may be calculated. The estimated deflection may be used to deform a deformable mirror (e.g., the deformable mirrors discussed in the example embodiments of the present invention presented herein) to a desired position. For example, it can be determined that a small, approximately 10 mm diameter, thin flexible disk mirror may be compressed at its circumference, by approximately 10 micrometers, to bulge, concavely or convexly, by approximately 300 micrometers at its center.

Thus, according to the mathematical relations presented below in calculation section II, the displacements of the surface (used as a mirror) for a disk with any given shape, (such as varying thickness) can be calculated numerically as a function of the forces applied to it. These calculations may be carried out by "finite element analysis" software packages. To determine the thickness profile that will create any desired surface function the finite element analysis is carried out for the initial thickness profile, the resulted displacement function is determined, compared to the desired function, and iteratively repeated with the corrected thickness profile, where a larger displacement required implies reducing the thickness and vice versa. For example, if the periphery of the disk deformable mirror is made thinner, when there is compression, the edge displacements are steeper then the parabolic profile of a uniform thickness disk. Arbitrary (possibly aspherical) surfaces could also be created to form any mirror shape without stress. A force may then be applied to displace the surfaces. Special properties of the plate material (glass, metals, carbon fiber, stretched membrane, etc.) may be used in order to achieve various ranges of displacements when responding to forces. For example, a dynamic concave or convex plate mirror may be provided with large displacements, by compression around the periphery of the plate, by homogeneously compression via a pressurized liquid or by applying a force at a center portion of the mirror.

Calculations

I. Estimation of the Forces and Displacements Generated by Disks

Analytical equations may be used to estimate the forces and displacements that can be expected in various mirror configurations (e.g., the force at center, circumferential force and pressure configurations described herein.) Piezoelectric devices may produce the force and expansion parameter needed to generate sufficiently large mirror deformation for both focusing and correction of aberration.

Figure 6:
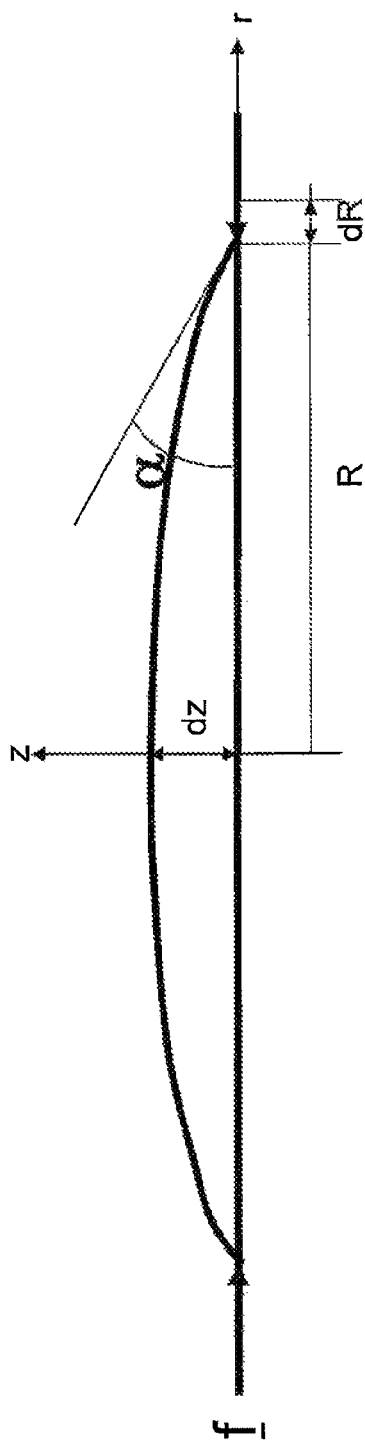
FIG. 6 is an illustration of bulging of a beam or a disk by forces.
Figure 6A:
FIG. 6A is an illustration of transduction of a central force.
Figure 6B:
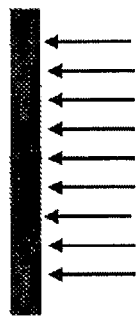
FIG. 6B is an illustration of transduction by distributed pressure.
Figure 6C:
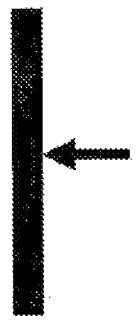
FIG. 6C is an illustration of transduction of circumferential forces.

In FIG. 6 and FIG. 6C a force f is applied to a one-dimensional (1D) beam along the beam axis, r, or a peripheral and uniform force is applied to a two-dimensional (2D) disk along the radial axis, r. In FIGS. 6A and 6B, a force is applied orthogonal to the beam axis at a single point and multiple points, respectively.

In FIG. 6A the mirror throw equals the maximum movement of the pistons. In FIG. 6B the forces may be applied by liquid pressure, and throw can be enhanced by a hydraulic system as shown in FIG. 5A. When forces are applied preferentially on the mirror, according to FIG. 6C, the throw can be greatly enhanced, as described herein. For the 2D case the radial section is identical to the 1D schematic. The z-axis is perpendicular to the r-axis. The numerical estimates for the 1D and 2D cases are very close. An order of magnitude estimate for the amount of bulging of a one-dimensional uniform beam, and of a two-dimensional disk with uniform thickness, may be obtained by keeping only the quadratic term in the displacement along the z-axis, $dz(r)$, as a result of introducing a force, f, Assuming conservation of length (1D-case) and area (2D-case) upon bending, the bulging profile is, at this approximation, parabolic, $dz(r) = ar^2$, thus the angle, $\alpha$, formed between the r-axis and the beam edge (or disk perimeter) is:

$$1/\cos \alpha = \sqrt{1+\tan^2 \alpha} = \sqrt{1+(dz/dr)^2} \sim (1+2a^2r^2) \quad (1)$$

Compressing the radius, R, by $\Delta R$, and preserving the length of the bent beam/disk results in:

$$R+\Delta R = \text{integral from 0 to R on} \{dr/\cos \alpha\} = R+2/3 a^2 R^3 \quad (2)$$

$$R+\Delta R = \int_0^R \{dr/\cos \alpha\} = R+2/3 a^2 R^3 \quad (3)$$

$$\alpha = \sqrt{3\Delta R/2R^3} \quad (4)$$

$$dz = aR^2 = \sqrt{3R\Delta R/2} \quad (5)$$

where a is defined above: $dz(r) = ar^2$.

For example, in the case of a 10 mm long beam, R=5 mm, $\Delta R$=10 micrometer the bulging at its center dz is:

$$dz = \sqrt{3*5000*10/2} = 274 \text{ micrometers} \quad (6)$$

For a disk, area preservation implies:

$$\pi(R+\Delta R)^2 = \text{integral from 0 to R on } \{2\pi R dR/\cos \alpha\} = 2\pi(R^2/2+2/4a^{2R4}) \quad (7)$$

$$\pi(R+\Delta R)^2 = \int_0^R \{2\pi R dR/\cos \alpha\} = 2\pi(R^2/2+2/4a^{2R4}) \quad (8)$$

$$dz = aR^2 = \sqrt{2R\Delta R} \quad (9)$$

Bulging is similar in magnitude to the above: for R=5 mm, $\Delta R$=10 micrometer $$dz = \sqrt{2*5000*10} = 316 \text{ micrometers} \quad (10)$$

As set forth in L. D. Landau & E. M. Lifshitz, Theory of Elasticity, Butterworth Heinemann, 1986, which is incorporated herein by reference, the rigorous solution for a disk of uniform thickness, h, pressed vertically at its center by force $f_z$ and supported on its periphery is as follows:

$$dz = f_z/(16\pi D)*[(3+\nu)/(1+\nu)*(R^2-r^2)-2r^2 \log(R/r)] \quad (11)$$

$$D = E h^3/[12(1-\nu^2)] \quad (12)$$

Substituting for Young's modulus, $E=60\times10^3 N/mm^2$; Poisson ratio, $\nu=0.2$ (glass); R=5 mm; h=0.2 mm; for dz=0.3 mm at r=0 results in:

$$f = 30 \text{ Newton [approximately 3 Kgm force].} \quad (13)$$

The peripheral force can be estimated from the bulging angle at R, $\cos^2 \alpha = 1-6\Delta R/R$ $$\sin \alpha = \sqrt{6\Delta R/R} \sim 0.11 \ f_z/\sin \alpha = 9f \sim 270 \text{ Newton [approximately 27 Kgm force]} \quad (14)$$

The solution for a pressure P, applied to a disk of uniform thickness is:

$$dz = 3P(1-v^2)/(16E\,h^3)*(R^2-r^2)*[(5+v)/(1+v)*R^2 - r^2]*(R^2-r^2). \quad (15)$$

II. The Differential Equations of Elasticity used to Solve Numerically the Distortions of an Arbitrary Shaped Material when a Set of Forces are Applied to it Differential equations of forces and distortions in elastic medium are provided for use by "finite element analysis" to solve deformations of arbitrarily shaped solid bodies such that, given the deformations need for focusing and correction of aberrations for a particular optical system, a thickness function (or for membranes a stiffness function) for deformable mirrors, as described herein, may be determined. Thus, as described below, a design of the thickness function of a disk mirror may be determined so as to obtain a desired deformation function on its reflecting surface.

Figure 7:
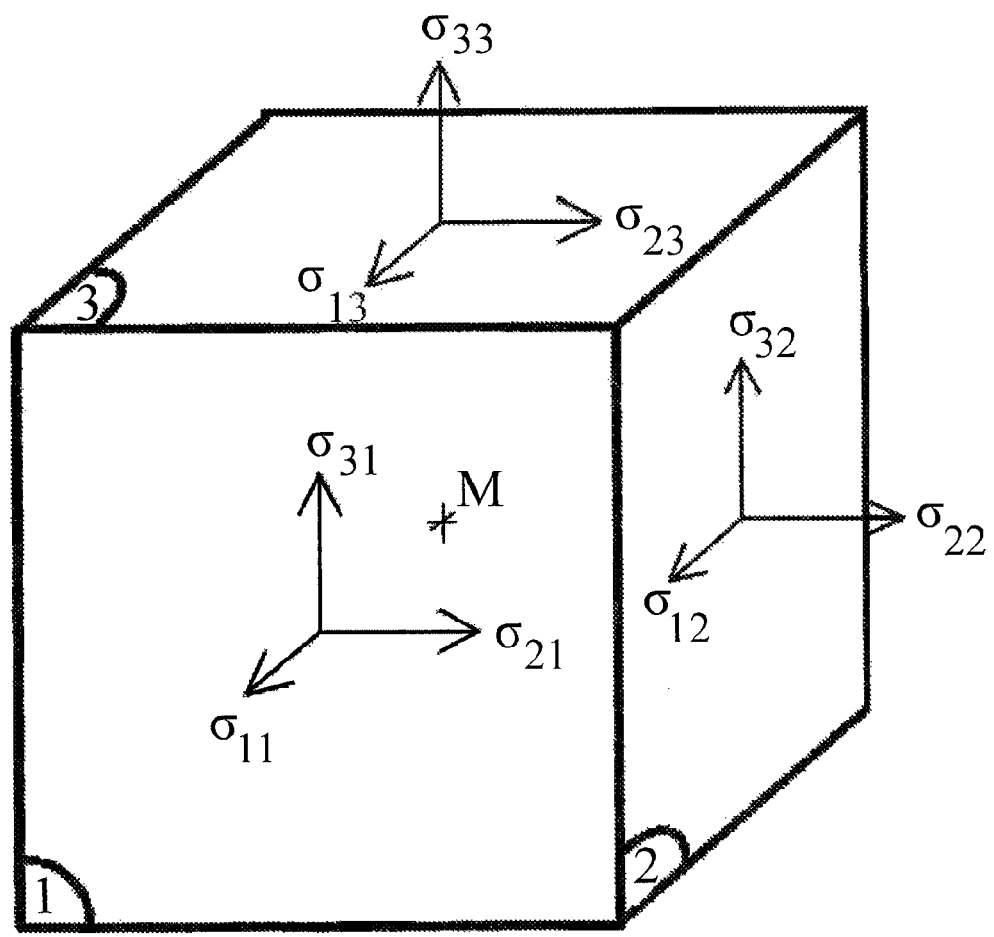
FIGS. 7 and 8 are illustrations of stress and strain tensors and forces in rectangular and in cylindrical coordinates.
Figure 8:
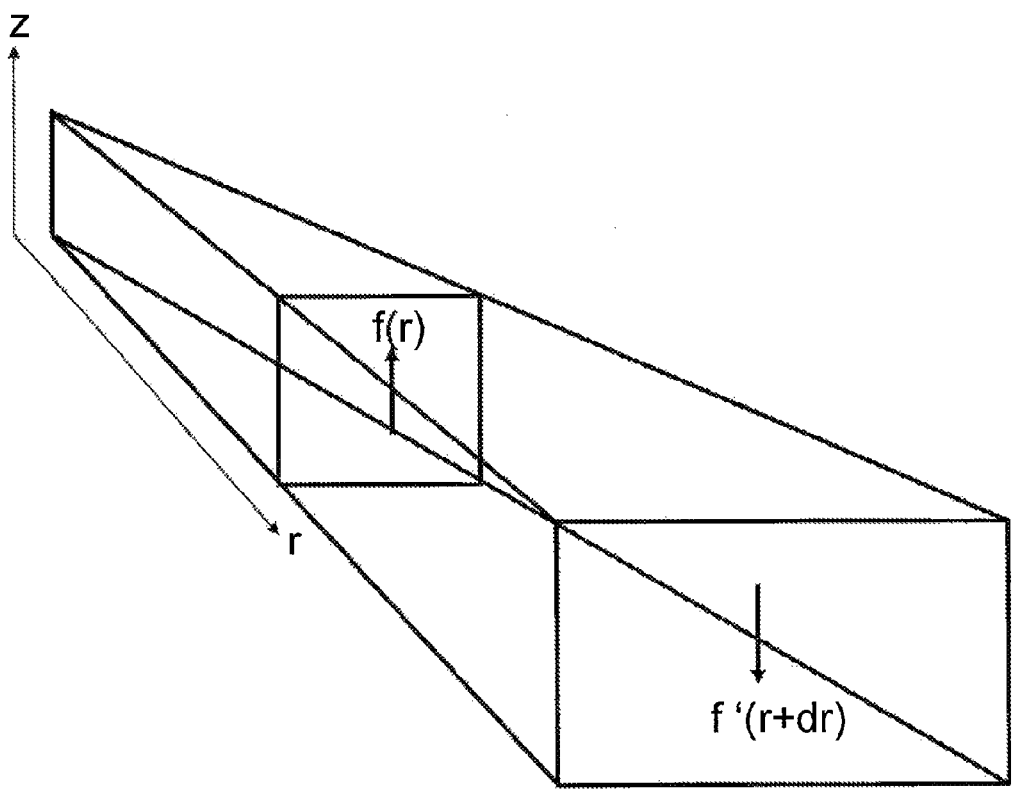

The shape of a piece of material with known elastic properties, such as a disk with an uneven thickness, can be calculated given the forces acting on it. For example, the shape of the disk can be determined when pushed or pulled at its center. These calculations may be used to find the thickness as a function of radius (or more generally, position) that will result in a desired deformation function such that a deformable mirror (e.g., the deformable mirrors discussed in the example embodiments of the present invention presented herein) will create a desired phase shift function for a wavefront reflected from its surface. FIGS. 7 and 8 provide illustrations of stress and strain tensors in rectangular and cylindrical coordinates. The equilibrium equation relating "body forces", $f_j$, and stress tensor, $\Phi_{ij}$ is:

$$f_j = ?\Phi_{ij}/?x_i \quad (16)$$

Generalized Hooke's law is:

$$\Phi_{ij} = C_{ijkl}\epsilon_{kl} \quad (17)$$

where the indices i, j, k and 1 run on the coordinates x,y,z (reference is made to L. D. Landau & E. M. Lifshitz, Theory of Elasticity, Butterworth Heinemann, 1986, for details regarding vector and matrix annotation, which is incorporated by reference herein), and where the displacements, $u_l$, and the strain tensor $\epsilon_{kl}$ are related by the following equation:

$$\epsilon_{kl} = ?u_l/?x_k \quad (18)$$

Therefore the equilibrium displacements of an object under forces obey the following equation:

$$f_j = ?C_{ijkl}\epsilon_{kl}/?x_i = ?_i(C_{ijkl}?_k u_l) \quad (19)$$

The strain tensor can be expressed in cylindrical coordinates, (r$\phi$z) as follows:

$$\epsilon_{rr} = ?u_r/?r;\ \epsilon_{\phi\phi} = 1/r\,?u_\phi/?\phi + u_r/r;\ \epsilon_{zz} = ?u_z/?z \quad (20)$$

$$2\epsilon_{\phi z} = 1/r\,?u_z/?\phi + ?u_\phi/?z;\ 2\epsilon_{rz} = ?u_r/?z + ?u_z/?r;$$
$$2\epsilon_{r\phi} = ?u_\phi/?r - u_{100}/r + 1/r\,?u_r/?\phi \quad (21)$$

For cylindrically symmetric cases: $u_{100} = ?u_z/?\phi = ?u_r/?\phi = 0$, therefore:

$$\epsilon_{\phi z} = \epsilon_{r\phi} = 0;\ 2\epsilon_{rz} = ?u_r/?z + ?u_z/?r \quad (22)$$

$$\epsilon_{rr} = ?u_r/?r;\ \epsilon_{\phi\phi} = u_r/r;\ \epsilon_{zz} = ?u_z/?z \quad (23)$$

For a thin plate with "flexural rigidity" $D(r) = Eh^3(r)/12(1-v^2)$, the displacements perpendicular to its surface, $\zeta = u_z$, as a result of force f(r) in the z direction:

$$\Delta\zeta^2 = ?^2\zeta/?r^2 + v/r\,?\zeta/?r = f(r)/D(r) \quad (24)$$

$$D = E\,h^3(r)/12(1-v^2) \quad (25)$$

where: E=Young modulus, v=Poisson ratio, h(r)=disk thickness.

For force along r, the full differential equation $f_j = ?_i(C_{ijkl}?_k u_l)$ must be integrated, but for cylindrical symmetry only the two dimensional problem in r, z coordinates should be solved. This much faster two-dimensional numerical solution for the radially symmetric problem allows iterative optimization of the disk thickness function given the desired distortion function which is dictated by the needed phase-shifts to focus and correct aberrations in an optical system.

The equations for the cylindrically-symmetric case are therefore:

$$\Sigma_i \partial^2 u_k/\partial x_i^2 + 1/(1-2v)\partial/\partial x_k \{\Sigma_i \partial u_i/\partial x_i\} = -[2(1+v)/E] f_k \quad (26)$$

$f_k$=body forces that are zero inside the volume.
where $u_i$ are the displacements along x,y and z for i=1,2 and 3 respectively; $x_i$ are x,y and z for i=1,2 and 3.
v and w are defined below after their first use in Equations 27,28.

On all free boundaries, the stress tensor is zero: $\sigma_{ij} = \partial u_i/\partial x_k = 0$ i,j=1,2 for (r,z)
and where forces are applied: $\partial \sigma_{ik}/\partial x_k = -f_i$
Rewriting for the radial and vertical displacements v and w:

$$\partial/\partial r[(1+A)r\partial v/\partial r] + A\,\partial/\partial r[\partial w/\partial z] + \partial/\partial z[r\partial v/\partial z] + 2(1+A)\partial v/\partial r + v/r = Bf_r \quad (27)$$

$$\partial/\partial r[\partial w/\partial r] + \partial/\partial z[(1+A)\partial w/\partial z] + \partial/\partial z[Ar\partial v/\partial r] + 2A\partial v/\partial z + 1/r\partial w/\partial r = Bf_z \quad (28)$$

where $v(r,z) = u_r(r,z)/r$ and $w(r,z) = u_z(r,z)$ are the radial and vertical displacements.

$$A = 1/(1-2v)\ \text{Poisson ratio typical value: v0.2} \quad (29)$$

$$B = -2(1+v)/E\ \text{Young's modulus typical value: E} = 60 \times 10^3 \text{N/mm}^2 \quad (30)$$

Rewriting these equations for the explicit finite element analysis formulation:

$$\partial/\partial r[C_{11}\partial/\partial r[v]] + \partial/\partial r[D_{11}\partial/\partial r[w]] + + \partial/\partial r[C_{12}\partial/\partial z[v]] + \partial/\partial r[D_{12}\partial/\partial z[w]] + + \partial/\partial z[C_{12}\partial/\partial r[v]] + \partial/\partial z[D_{21}\partial/\partial r[w]] + + \partial/\partial z[C_{22}\partial/\partial z[v]] + \partial/\partial z[D_{22}\partial/\partial z[w]] + + \partial/\partial r[A_1 v] + \partial/\partial r[B_1 w] + + \partial/\partial z[A_2 v] + \partial/\partial z[B_2 w] + + E_0 = B\,f_r \quad (31)$$

$$\partial/\partial r[C_{11}\partial/\partial r[v]] + \partial/\partial r[D_{11}\partial/\partial r[w]] + + \partial/\partial r[C_{12}\partial/\partial z[v]] + \partial/\partial r[D_{12}\partial/\partial z[w]] + + \partial/\partial z[C_{21}\partial/\partial r[v]] + \partial/\partial z[D_{21}\partial/\partial r[w]] + + \partial/\partial z[C_{22}\partial/\partial z[v]] + \partial/\partial z[D_{22}\partial/\partial z[w]] + + \partial/\partial r[A_1 v] + \partial/\partial r[B_1 w] + + \partial/\partial z[A_2 v] + \partial/\partial z[B_2 w] + + E_0 = B\,f_z \quad (32)$$

Boundary Conditions:
w(R,0)=0 Disk supported at radius R.
$v(0,z) = \partial v(0,z)/\partial r = \partial w/\partial r = 0$ From symmetry—center not radially distorted.
B $f_r(r,z) = 0$
B $f_z(r,0) = P$ constant pressure or B $f_z(0,0) = F$ force at center.

Figure 10A:
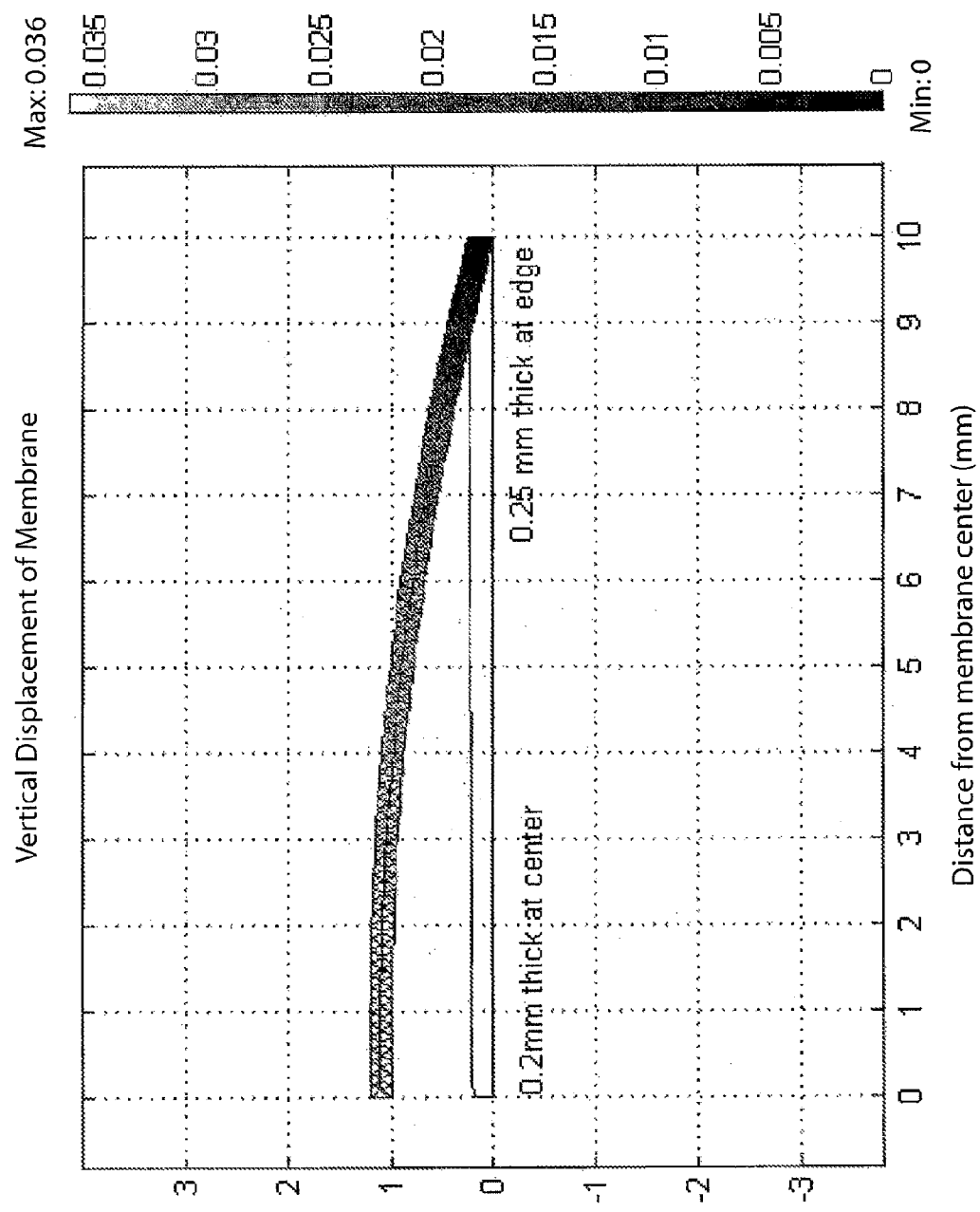
FIGS. 10A, 10B and 10C are graphs depicting numerical results obtained from finite element analysis of the distortions of a variable thickness disk.
Figure 10B:
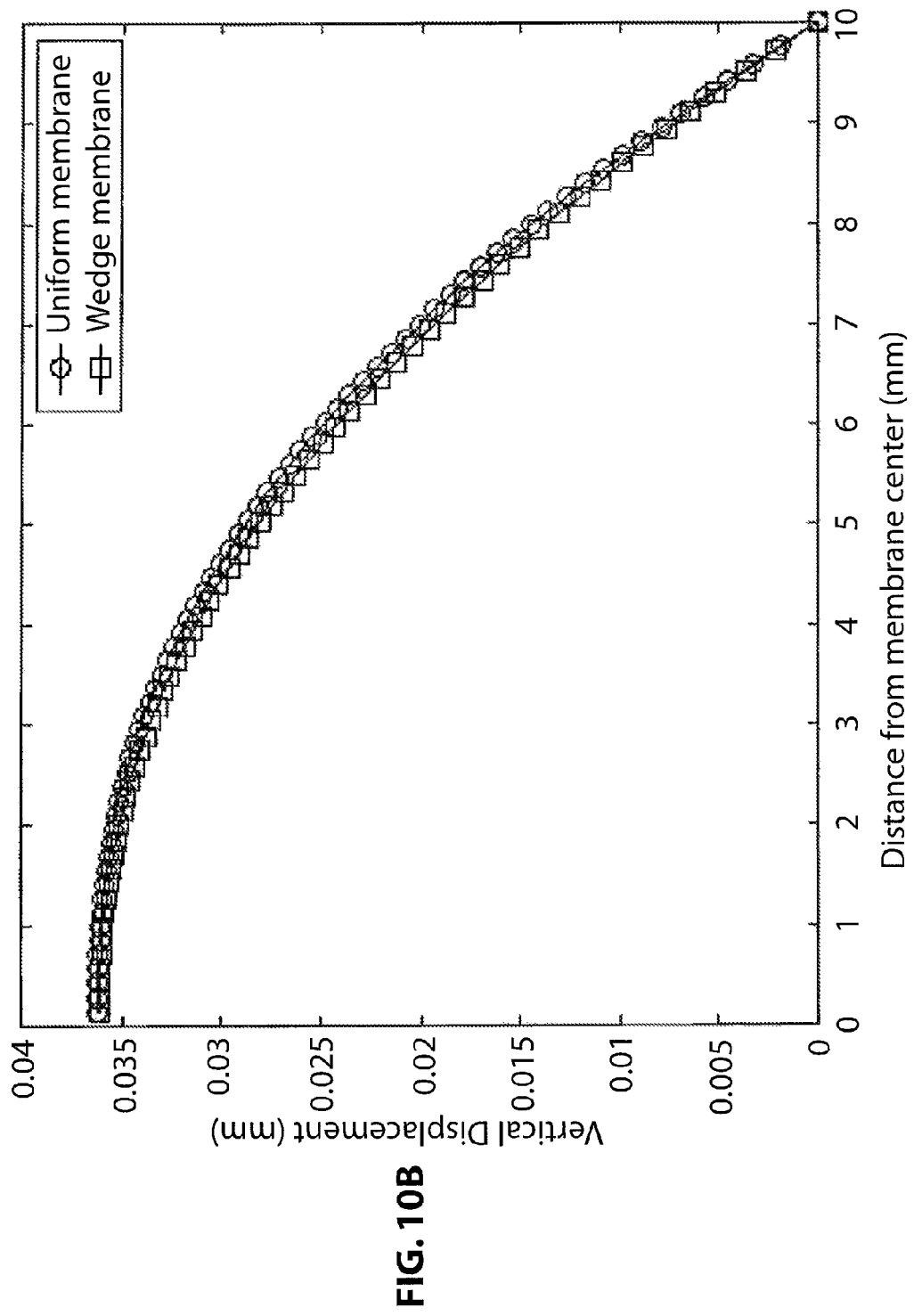
Figure 10C:
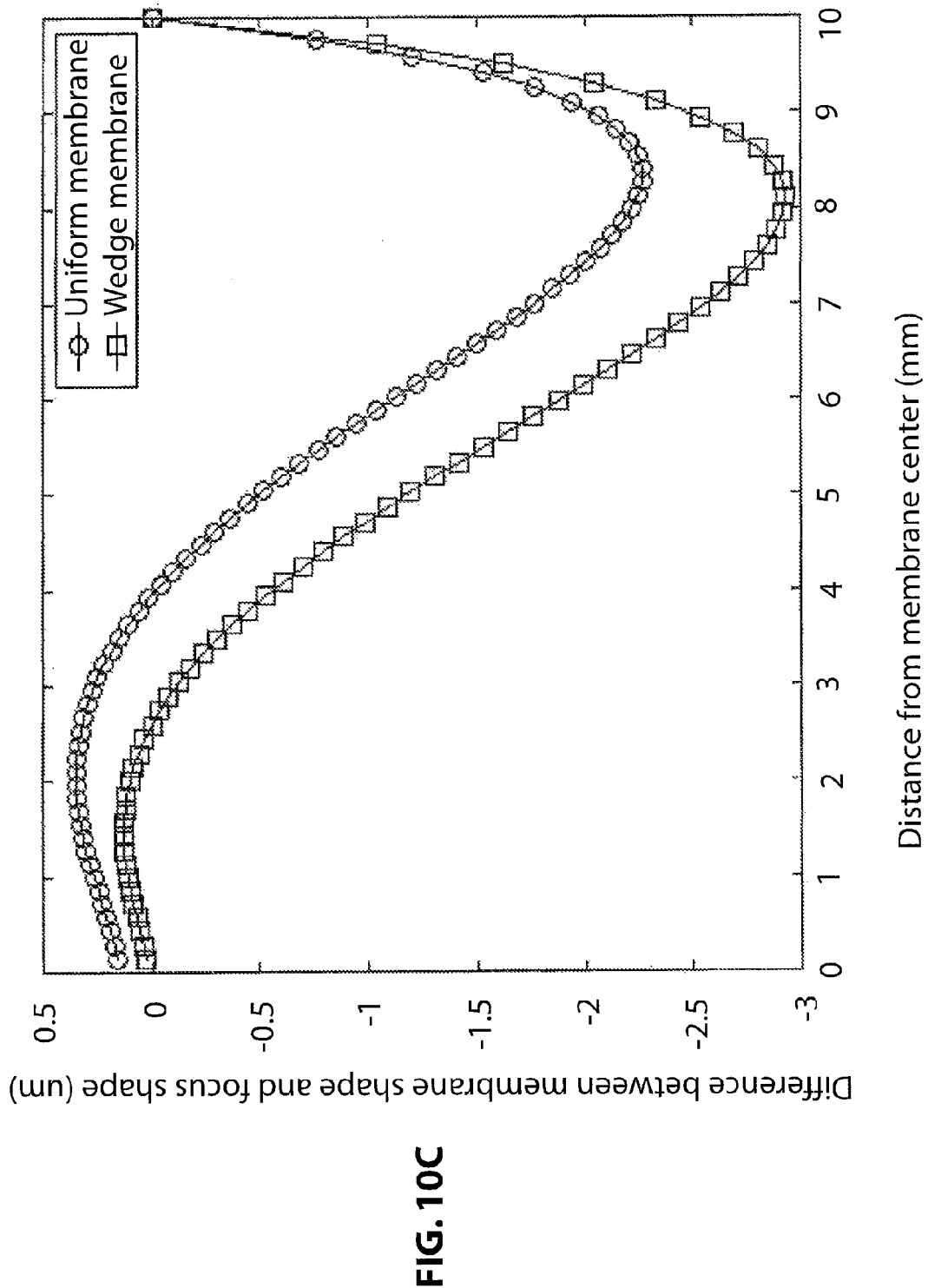

These equations may be solved for several cases using Finite Element Analysis software, and representative results are displayed in FIGS. 10A, 10B and 10C. The analysis of the displacement hi z, perpendicular to the disk, indicates that optimization of the disk thickness can fit a displacement function required for wavefront phase correction.

FIG. 10A is the result of a finite element calculation of the displacement of a membrane that is thicker at the edge than the center. The gray scale shows the vertical displacement of the membrane in millimeters. The shape of the membrane in the figure is not to scale. FIG. 10B is a comparison of vertical displacement for the membrane shape for a membrane with uniform thickness and a membrane of wedged thickness. FIG. 10C depicts the difference between the membrane shape and the desired shape—for focusing into n=1.42 refractive index material with a 1.285 numerical aperture—for both a uniform and wedged membrane.

III. Deformation Function for Correcting Index Mismatch Aberrations and, Change Focus Equations may be used to determine the deformation function needed by a deformable mirror. For example, equations for wavefront correction required for a particular case of live sample microscopy and focusing into optical recording media may be provided. A phase-shift function responsible for spherical aberrations induced by mismatched index of refraction, such as between oil-immersion objective in a microscope and water-embedded live biological sample or between air lens and plastic recording media, may be provided. The phase-shift as a function of emergence angle from a point within the sample at a given depth determines the deformation function of a mirror located in the microscope pupil plane (or any other plane conjugated to it).

The following is a specific example for the generation by a deformable mirror of the above described phase shifts for wavefronts in microscopy, where the thickness of the disk mirror is fitted to create correction for aberrations induced by sample depth inside a refractive medium different then the cover glass and objective immersion medium. In the pupil plane, where the mirror is placed, the angle of emergence from the specimen, θ is proportional to the radial coordinate of the mirror, r. FIGS. 9A and 9B show the phase v. angle and the radial dependence of a mirror displacement that is needed to correct for phase aberration resulting from refractive index mismatch. FIG. 9A illustrates the phase v. angle for an immersion medium with refractive index n=1.518, and a sample buffer with refractive index n'=1.38, at a depth D=5 and 10 micrometers below a cover slide. The data for focusing from air into a plastic recording medium is plotted in FIG. 9B. According to FIGS. 9A and 9B, the curves 1 and 3 plot the phases added to a wavefront for focusing into depth D, and correct the aberrations due to index mismatch according to:

$$\text{Phase}(\theta) = Dn \cos \theta' \tag{33}$$

With the values: D=5 m n=1.518 n'=1.38 and n sin θ=n'sin θ' for FIG. 9A, and n=1.0 n'=1.4 for FIG. 9B.

The second curves 2 and 4 plot the phases added to a wavefront focused into depth D=10 micrometers, that will only correct the aberrations due to index mismatch according to:

$$\text{Phase}(\theta) = D(n'\cos \theta' - n \cos \theta) \tag{34}$$

As observed, correction for aberration and changing focus requires about twice the phase shift as just for correcting aberrations.

These equations are derived from the '070 application as well as a paper entitled "Modeling the Application of Adaptive Optics to Wide-Field Microscope Live Imaging", J. Microscopy 226:33-42 (2007), Z. Kam, P. Kner, D. Agard, and J. W. Sedat, which is incorporated herein by reference.

What is claimed is:

1. An apparatus for correcting optical aberrations in an optical device, comprising:
   a deformable mirror having a variable thickness and a reflective surface having a first shape in an undeformed state; and
   a single actuator configured to deform the deformable mirror by applying a substantially uniform radially-inward compressive force around a circumference of the deformable mirror via a circumferential element positioned around the circumference of the deformable mirror, the reflective surface being deformed to a second shape different from the first shape upon application of the compressive force.

2. The apparatus of claim 1, wherein the actuator includes a piezoelectric device.

3. The apparatus of claim 1, wherein the reflective surface of the deformable mirror has a planar shape in the undeformed state, and forms a concave or convex shape when the compressive force is applied.

4. The apparatus of claim 1, wherein the circumferential element includes at least one of a collet chuck and a contracting ring.

5. The apparatus of claim 1, wherein the circumferential element includes a piston transducer.

6. The apparatus of claim 1, wherein the deformable mirror includes a membrane having a variable flexibility.

7. The apparatus of claim 1, wherein the deformable mirror is thinner at its periphery than at its center.

8. The apparatus of claim 1, wherein the deformable mirror is thicker at its periphery than at its center.

9. The apparatus of claim 1, wherein the reflective surface of the deformable mirror has a concave or convex shape in the undeformed state and forms a further concave or convex shape when the compressive force is applied to it.

10. The apparatus of claim 1, wherein the deformable mirror includes a flat disk mirror.

11. The apparatus of claim 10, wherein the deformable mirror includes a flat disk mirror and includes at least one of a metal and a glass.

12. The apparatus of claim 1, wherein the actuator deforms the deformable mirror in accordance with a predetermined function that is based on the variable thickness of the deformable mirror.

13. The apparatus of claim 1, wherein the actuator deforms the deformable mirror in accordance with a predetermined function that is based on a differential equation of elasticity for a specific disk configuration and set forces applied to the disk configuration.

14. The apparatus of claim 1, wherein the actuator deforms the deformable mirror according to a numerical calculation of the deflection of the deformable mirror, the calculation determined by explicit numerical solutions of the differential equations of elasticity according to generalized Hook's law:

$$f_j = \partial_i (C_{ijkl} \partial_k u_l)$$

where $f_j$ are applied forces, $u_l$ are displacements, and $C_{ijkl}$, elastic tensor elements, wherein, if spherical aberrations are being corrected and the deformable mirror is cylindrically symmetric, the generalized three-dimensional Hook's law is reduced to two-dimensional equations.

15. An apparatus of claim 1, further comprising:
   a coating applied on the reflective surface of the deformable mirror, the coating including an electroactive material.

16. The apparatus of claim 15, wherein the electroactive material is an electroactive polymer.

17. The apparatus of claim 16, wherein the electronactive polymer takes a convex or concave shape.

18. The apparatus of claim 16, wherein the electroactive polymer contracts or expands in response to a variable voltage applied therethrough, thereby shifting a wavefront reflected from the deformable mirror.

19. An apparatus for correcting optical aberrations in an optical device, comprising:
- a deformable mirror including a membrane having variable flexibility and a reflective surface having a first shape in an undeformed state; and
- a single actuator configured to deform the membrane by applying a substantially uniform radially-inward compressive force around a circumference of the deformable mirror via a circumferential element positioned around the circumference of the deformable mirror, the reflective surface being deformed to a second shape different from the first shape upon the application of the compressive force.

20. The apparatus of claim 19, wherein the variable flexibility is varied by changing a concentration of a plasticizer in the membrane.

21. The apparatus of claim 19, wherein the actuator includes a piezoelectric device.

22. The apparatus of claim 19, wherein the deformable mirror is thinner at its periphery than at its center.

23. The apparatus of claim 19, wherein the deformable mirror is thicker at its periphery than at its center.

24. A method for correcting optical aberrations in an optical device comprising:
(a) positioning an adaptive optical system in or close to a pupil plane, wherein the adaptive optical system includes at least one adaptive optical element, the adaptive optical element comprising a deformable mirror having a variable thickness and a single actuator configured to deform the deformable mirror;
(b) configuring the adaptive optical element to correct optical aberrations at a first depth of focus within a sample; and
(c) reconfiguring the adaptive optical element to correct optical aberrations at a second depth within the sample, the second depth being different from the first depth,
wherein at least one of the configuring the adaptive optical element and the reconfiguring the adaptive optical element includes applying a substantially uniform radially-inward compressive force to the deformable mirror via a single circumferential element positioned around a periphery of the deformable mirror.

25. The method of claim 24, wherein the optical device is a wide-field microscope, further comprising the step of:
acquiring a plurality of images at different depths of focus within the sample successively over a predetermined period of time.

26. The method of claim 24, wherein the optical device includes a multilayer optical read/write device, the method further comprising the steps of: configuring the adaptive optical element to write or read from a layer at any needed depth inside a recording medium; and correcting for a depth-induced aberration.

27. The method of claim 24, wherein the optical device includes laser tweezers.

28. The method of claim 24, wherein the deformable mirror is incorporated as a reflective surface in a catadioptric objective.

29. The method of claim 24, wherein the deformable mirror surface in coated with an active layer of material configured to change light paths as a function of position.

30. The method of claim 24, wherein the deformable mirror is thinner at its periphery than at its center.

31. The method of claim 24, wherein the deformable mirror is thicker at its periphery than at its center.

* * * * *

UNITED STATES PATENT AND TRADEMARK OFFICE
CERTIFICATE OF CORRECTION

PATENT NO. : 8,894,227 B2  
APPLICATION NO. : 12/863866  
DATED : November 25, 2014  
INVENTOR(S) : Peter Kner et al.

Page 1 of 1

It is certified that error appears in the above-identified patent and that said Letters Patent is hereby corrected as shown below:

On the Title page, item (12), and in the Inventors, item (75), change "Knor" to --Kner--.

Signed and Sealed this  
Twelfth Day of May, 2015

Michelle K. Lee  
*Director of the United States Patent and Trademark Office*